(12) United States Patent
Antonsson et al.

(10) Patent No.: US 7,907,082 B2
(45) Date of Patent: Mar. 15, 2011

(54) METHOD AND SYSTEM FOR PRESENCE DETECTION

(75) Inventors: Anders Antonsson, Västra Frölunda (SE); Göran Svedoff, Västra Frölunda (SE)

(73) Assignee: Volvo Car Corporation, Gothenburg (SE)

( * ) Notice: Subject to any disclaimer, the term of this patent is extended or adjusted under 35 U.S.C. 154(b) by 306 days.

(21) Appl. No.: 12/253,494

(22) Filed: Oct. 17, 2008

(65) Prior Publication Data

US 2009/0167590 A1    Jul. 2, 2009

(30) Foreign Application Priority Data

Oct. 19, 2007  (EP) .................................. 07118875
Oct. 16, 2008  (EP) .................................. 08166777

(51) Int. Cl.
    *G01S 13/00*    (2006.01)
(52) U.S. Cl. ................ 342/27; 342/70; 342/82; 342/89
(58) Field of Classification Search .............. 342/27, 342/28, 70–73, 82–103, 134, 137
    See application file for complete search history.

(56) References Cited

U.S. PATENT DOCUMENTS

| | | | | |
|---|---|---|---|---|
| 4,027,307 A * | 5/1977 | Litchford | ........................ | 342/32 |
| 4,152,701 A * | 5/1979 | Mara et al. | ........................ | 342/21 |
| 4,595,924 A * | 6/1986 | Gehman | ........................ | 342/28 |
| 4,697,184 A * | 9/1987 | Cheal et al. | ........................ | 342/28 |
| 5,371,502 A * | 12/1994 | Dittmann | ........................ | 342/68 |
| 6,097,301 A * | 8/2000 | Tuttle | ........................ | 340/693.9 |
| 6,206,340 B1 * | 3/2001 | Paese et al. | ........................ | 251/129.04 |
| 6,208,248 B1 * | 3/2001 | Ross | ........................ | 340/552 |
| 6,239,736 B1 * | 5/2001 | McDonald et al. | ........................ | 342/28 |
| 6,400,307 B2 * | 6/2002 | Fullerton et al. | ........................ | 342/28 |
| 6,426,716 B1 * | 7/2002 | McEwan | ........................ | 342/28 |
| 6,568,655 B2 * | 5/2003 | Paese et al. | ........................ | 251/129.04 |
| 6,587,047 B2 * | 7/2003 | Nilsson et al. | ........................ | 340/554 |
| 6,603,421 B1 * | 8/2003 | Schiff et al. | ........................ | 342/13 |
| 6,816,107 B2 * | 11/2004 | Pleva et al. | ........................ | 342/74 |
| 7,421,321 B2 * | 9/2008 | Breed et al. | ........................ | 701/29 |
| 7,696,919 B2 * | 4/2010 | Moraites | ........................ | 342/14 |
| 7,760,130 B2 * | 7/2010 | Antonsson | ........................ | 342/27 |
| 2003/0193430 A1 * | 10/2003 | Gresham et al. | ........................ | 342/70 |
| 2004/0004567 A1 * | 1/2004 | Kroeger et al. | ........................ | 342/109 |
| 2005/0073424 A1 * | 4/2005 | Ruoss et al. | ........................ | 340/686.6 |

* cited by examiner

*Primary Examiner* — Thomas H Tarcza
*Assistant Examiner* — Peter Bythrow
(74) *Attorney, Agent, or Firm* — Brooks Kushman P.C.

(57) ABSTRACT

A method and system for presence detection within a detection volume delimited by an inner radius and an outer radius using microwave radiation. The outer radius of the detection volume is controlled by selecting the length of a first pulse controlling the transmit interval of a microwave transmitter and by selecting the length of a third pulse controlling the receive interval of a microwave receiver. The inner radius of the detection volume is controlled through selecting the length of a second pulse defining a predetermined time period between the first pulse and the third pulse.

5 Claims, 3 Drawing Sheets

METHOD AND SYSTEM FOR PRESENCE DETECTION

CROSS-REFERENCE TO RELATED APPLICATION

This application claims foreign priority benefits under 35 U.S.C. §119(a)-(d) to EP 07118875.9. filed Oct. 19, 2007 and EP 08166777.6 filed Oct. 16, 2008, which are hereby incorporated by reference in their entirety.

BACKGROUND

1. Technical Field

The present invention relates detection of moving objects within a defined space using microwave radiation.

2. Background Art

Systems for detection of the presence of humans and animals in a defined area or space are well-known and are commonly used, for example as intrusion detection systems. With regard to vehicles, for example, it is common today to use intrusion detectors in order to provide an alarm in the event that the presence of a human or an animal is detected within the passenger compartment of the vehicle. In this manner, it can be expected that the risk for theft of the vehicle can be decreased.

A system for presence detection in a vehicle may comprise a combined radio transmitter and receiver based on microwave technology, which means that the radio transmitter is arranged for emitting microwave radiation into a specified space corresponding to the vehicle's passenger compartment. Furthermore, the receiver is arranged for detecting any microwave radiation which is reflected as a result of humans or animals being present in said space. In order to achieve this, it is previously known to use microwave-based detection units of the so-called Doppler motion sensor type. Such units are based on the Doppler shift phenomenon in order to detect motion of humans and animals in a space.

Patent document U.S. Pat. No. 6,426,716, which is herein incorporated by reference, teaches a motion sensor based on a microwave transceiver apparatus. The apparatus comprises a transmit pulse generator being arranged to control the length of the transmit pulses, and thereby, in part, the range of the transceiver.

In the field of intrusion detection, especially in vehicle intrusion detectors, it may be preferable that intrusion only be detected in a very well-defined space, i.e. corresponding to within a well-defined distance from the detector. In such case, the components used in the system, in particular the microwave transmitter and receiver, must be very accurate and of high quality so that the detection sphere can be defined in an exact manner within the vehicle. Otherwise, there will be a risk for false alarms if for example a person or animal passes just outside of the detection sphere. Consequently, there is a need for improved systems arranged for precisely regulating the detection boundaries around an intrusion detector—which means that false alarms can be minimized or preferably eliminated—while still using components and circuit solutions at a relatively low cost.

SUMMARY

A first aspect of the present invention provides a method for presence detection within a detection volume delimited by an inner radius and an outer radius. The method comprises transmitting microwaves from a center of the detection volume; detecting microwave radiation reflected back towards the center of the detection volume; and determining the presence of a moving object within the detection volume based on properties of the microwave radiation being received by the microwave receiver. In the embodiment of the invention, the outer radius of the detection volume is controlled through selecting a length of a first pulse which controls the transmission interval of the microwave transmitter and through selecting a length of a third pulse which controls a reception interval of the microwave receiver. Further, the inner radius of the detection volume is controlled through selecting a length of a second pulse defining a predetermined time period pause between the first pulse and the third pulse.

A second aspect of the present invention provides a system for presence control within a detection volume delimited by an inner radius and an outer radius. The system comprises a microwave-based transmitting and receiving unit including a microwave transmitter and a microwave receiver, and means for determining the presence of a moving object within the detection volume based on the properties of the microwave radiation being received by the microwave receiver. The system further comprises means for controlling the outer radius of the detection volume through selecting the length of a first pulse controlling the microwave transmitter to transmit the microwaves and through selecting the length of a third pulse controlling the microwave receiver to detect the microwave radiation reflected towards the center of the detection volume. The system further comprises means for controlling the inner radius of the detection volume through selecting the length of a second pulse for defining a predetermined time period pause between the first pulse and the third pulse.

It will be appreciated that features of the invention are susceptible to being combined in any combination without departing from the scope of the invention as defined by the accompany claims.

BRIEF DESCRIPTION OF THE DRAWINGS

By way of example only, embodiments of the present invention will now be described with reference to the accompanying drawings wherein.

Figure 1:
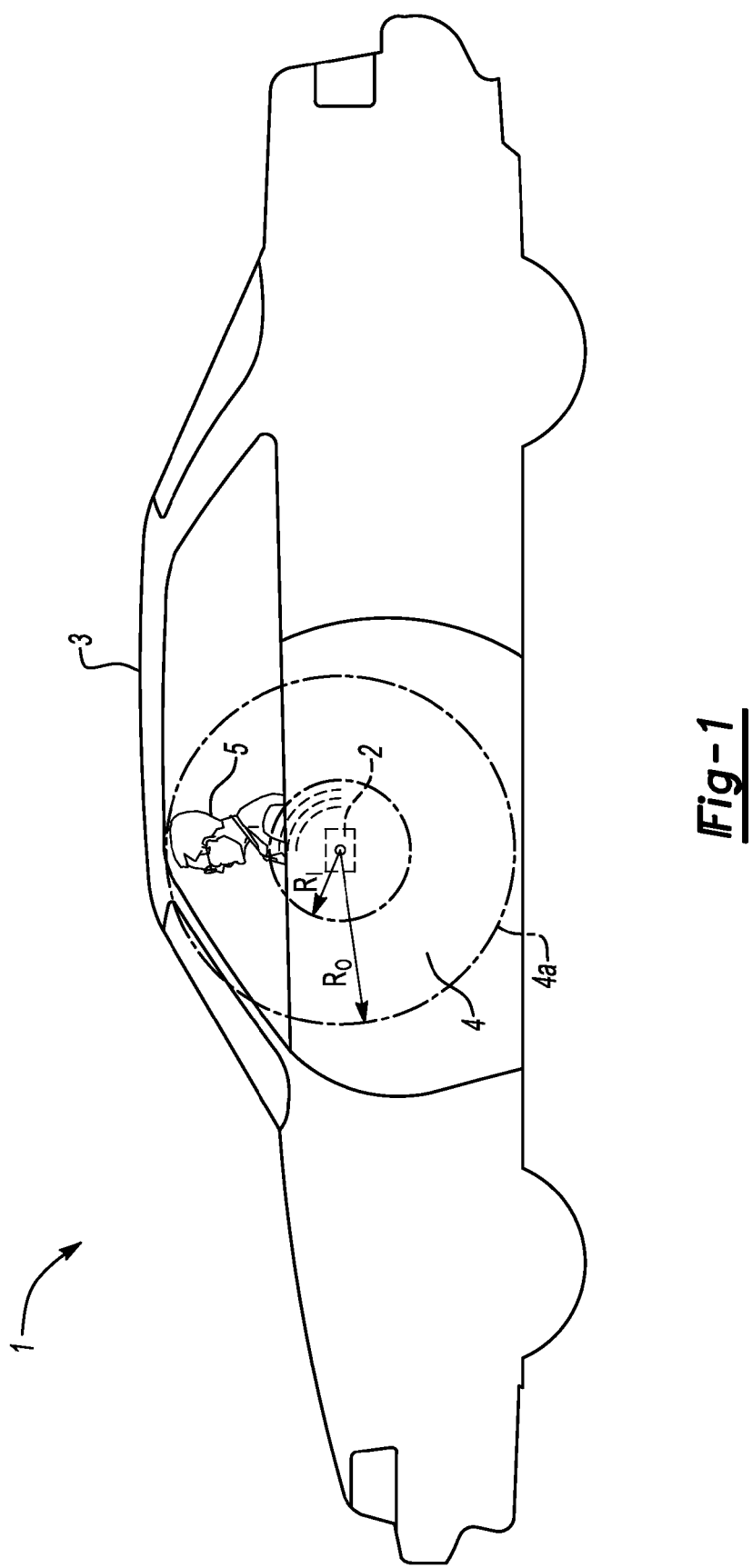
FIG. 1 is a schematic drawing of a vehicle being equipped with an arrangement in accordance with the present invention.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein. The same reference numerals will be used for illustrating corresponding features in the different drawings.

DETAILED DESCRIPTION OF EMBODIMENTS OF THE INVENTION

With reference to FIG. 1, there is shown a simplified schematic drawing of a part of a vehicle 1 which is equipped with a system for presence detection according to an embodiment of the present invention. More precisely, FIG. 1 shows a mid section of a conventional passenger car 1. As shown in a schematic manner, the car 1 is provided with a transmitter and receiver unit 2 for presence detection which is preferably positioned in a central part of the car's 1 passenger compartment 3. More precisely, the transmitter and receiver unit 2 is suitably located between the two front seats (not shown) of the vehicle, for example in a console which is mounted to the floor of the car 1.

As will be described in greater detail below, the transmitter and receiver unit 2 comprises a microwave transmitter which is arranged for transmitting microwave radiation into the passenger compartment 3. As illustrated in a schematic manner in FIG. 1, microwave radiation is emitted into a predetermined presence detection volume 4, i.e. a generally spherical "bubble" having dimensions and being positioned so as to correspond to a predetermined part of the passenger compartment of the car 1 in which the presence of a moving person (or animal) is to be detected. Such a person is illustrated in a simplified manner as indicated by reference numeral 5 in FIG. 1.

The predetermined detection volume 4 is delimited by an inner radius $R_I$ and an outer radius $R_O$ as originating from a center of the predetermined detection volume 4 where the transmitter and receiver unit 2 is located.

To achieve such detection, the transmitter and receiver unit 2 is arranged in a manner which now will be described in detail with reference to FIGS. 2 and 3.

Figure 2:
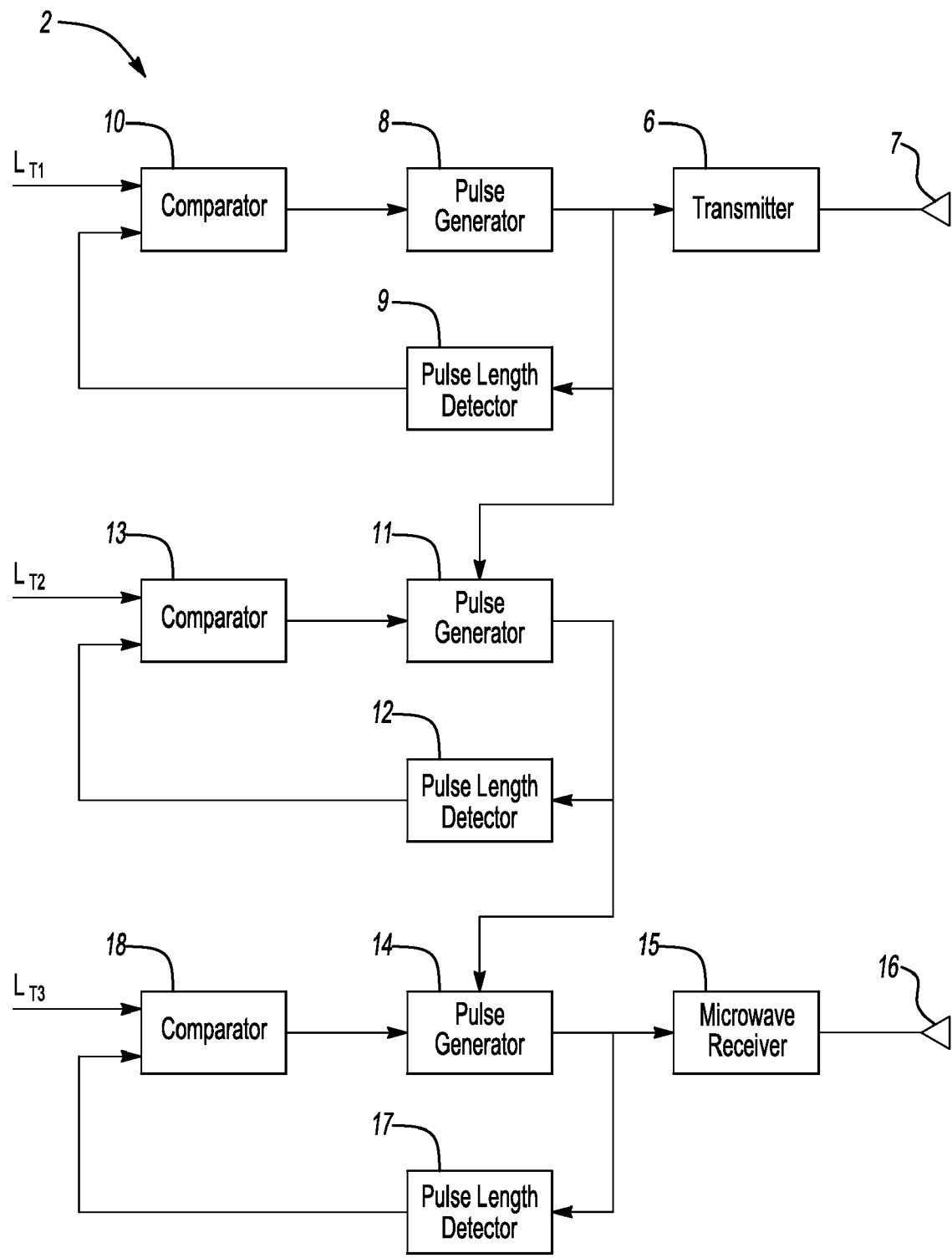
FIG. 2 is a schematic block diagram showing the design of an arrangement in accordance with an embodiment of the invention.

FIG. 2 is a schematic diagram of the transmitter and receiver unit 2, which comprises a microwave transmitter 6 and an associated transmitter antenna 7. The microwave transmitter 6 is arranged for feeding the transmitter antenna 7 so as to emit radiation generally in the microwave range. The operation of a microwave transmitter and receiver for the purpose of presence detection in a given zone or sphere is known as such, and for this reason it is not described in detail here. A previously used microwave-based detection unit is the so-called Doppler motion sensor.

The transmitter and receiver unit 2 comprises a first pulse generator 8, which is arranged so as to produce a series of pulses each having a predetermined target pulse length $L_{T1}$. The first pulse generator 8 is connected to the transmitter 6, which means that the pulses are used to control the operation of the microwave transmitter 6 in accordance with these pulses. More precisely, the microwave transmitter 6 is arranged to emit a burst of microwave radiation during each pulse. Also, a first pulse length detector 9 is provided for measuring the duration or actual pulse length $L_{A1}$ of each of these pulses, i.e. at the output of the first pulse generator 8, and for producing a measurement value representing the duration or actual pulse length $L_{A1}$. This measurement value is fed to a first comparator 10.

The first comparator 10 is arranged for comparing the actual pulse length $L_{A1}$ from the first pulse generator 8 with the predetermined target pulse length $L_{T1}$ and for producing a control signal which is fed from the output of the first comparator 10 and on to the first pulse generator 8. This means that a signal representing the target pulse length $L_{T1}$ to be generated by means of the first pulse generator 8 is fed to one of the inputs of the first comparator 10, whereas a signal representing the actual pulse length $L_{A1}$, as measured by means of the first pulse length detector 9, is fed to the other input of the first comparator 10. The first comparator 10 produces an error signal, which is proportional to the difference between the target pulse length $L_{T1}$ and the actual pulse length $L_{A1}$, and which error signal is used to produce a suitable control signal to the first pulse generator 8 for adjusting the output actually produced thereby. This is a control process which aims at producing pulses to control the microwave transmitter 6 to transmit microwaves during a time period that has a duration which is as close to the predetermined target value $L_{T1}$ as possible and has a very high level of accuracy.

Selection of the predetermined target value $L_{T1}$ contributes to a precise regulation of the outer detection boundary of the predetermined presence detection volume 4, i.e. the outer radius $R_O$ thereof. Through selecting the predetermined target value $L_{T1}$ e.g. such that a transmission period will end by the time the transmitted microwaves have travelled a distance corresponding to the outer radius $R_O$ of the predetermined detection volume 4, any microwave radiation reflected from a distance within the outer radius $R_O$ may be received.

Consequently, and as indicated in FIG. 2, a series of pulses is generated in the first pulse generator 8 and is used to activate the transmission of microwave radiation by means of the transmitter 6 and the associated antenna 7. However, each pulse generated by the first pulse generator 8 is also used to trigger a second pulse generator 11, which in turn will generate a second pulse, having a second target pulse length $L_{T2}$. Preferably, each second pulse is triggered by the trailing edge of a first pulse. The output of the second pulse generator 11 is connected to a second pulse length detector 12, which is arranged for measuring the duration or actual second pulse length $L_{A2}$, and for producing a measurement value which is fed to a second comparator 13.

In a manner which corresponds to the first comparator 10, the second comparator 13 is arranged for comparing the actual second pulse length $L_{A2}$ from the second pulse generator 11 with the predetermined second target pulse length $L_{T2}$ and for producing an error signal, which is proportional to the difference between the second target pulse length $L_{T2}$ and the actual second pulse length $L_{A2}$, and which error signal is used to produce a suitable control signal to the second pulse generator 11 for adjusting the output actually produced thereby. To this end, the target value $L_{T2}$ for the second pulse length, to be generated by means of the second pulse generator 11, is fed to one of the inputs of the second comparator 13, whereas a measurement, from the second pulse length detector 12, is fed to the other input of the second comparator 13.

The purpose of the second pulse is to define a short "time gap" immediately after the transmission of a pulse of microwave radiation by means of the transmitter 6. Selection of the predetermined second target pulse length $L_{T2}$ contributes to a precise regulation of the inner detection boundary of the predetermined presence detection volume 4, i.e. the inner radius $R_I$ thereof. Through selecting the predetermined second target pulse length $L_{T2}$ e.g. such that it corresponds to the time it would take for any microwave radiation reflected from a distance less than or equal to the inner radius $R_I$ of the predetermined detection volume 4 to return to the transmitter and receiver unit 2, any microwave radiation reflected from a distance within the inner radius $R_I$ may be excluded from reception. This is desirable in order to eliminate the risk of false detections caused by metal objects in close proximity of the transmitter and receiver unit 2 as well as close proximity movement, such as that by insects or vibrating panels, which due to the proximity of the transmitter and receiver unit 2 would otherwise have an disproportionally high impact.

As shown in FIG. 2, the second pulse which is generated by means of the second pulse generator 11 will also be used in order to trigger a further, third pulse generator 14. Preferably, the third pulse is triggered by the trailing edge of the second pulse. This means that the third pulse generator 14 is arranged for generating a series of third pulses each having a third target pulse length $L_{T3}$. Such a third pulse is used for controlling a microwave receiver 15, which is furthermore associated with a receiver antenna 16.

In other words, after the first pulse, i.e. when the transmitter 6 is actuated, and after the second pulse, the third pulse is used to actuate the receiver 15 in order to detect any reflected microwave radiation occurring at the receiver antenna 16 after this time gap has passed.

In a manner which corresponds to the first comparator 10 and second comparator 13, the third comparator 18 is arranged for comparing the actual third pulse length $L_{A3}$ from the third pulse generator 14 with the predetermined third target pulse length $L_{T3}$ for producing an error signal, which is proportional to the difference between the predetermined third target pulse length $L_{T3}$ and the actual third pulse length $L_{A3}$ and which error signal is used to produce a suitable control signal to the third pulse generator 14 for adjusting the output actually produced thereby. To this end, the target value $L_{T3}$ for the third pulse length is fed to one of the inputs of the third comparator 18, whereas a measurement from a third pulse length detector 17 (being connected to the output of the third pulse generator 14) is fed to the other input of the third comparator 18.

Selection of the predetermined third target pulse length $L_{T3}$ contributes further to the precise regulation of the outer detection boundary of the predetermined presence detection volume 4, i.e. the outer radius $R_0$ thereof. Through selecting the predetermined third target pulse length $L_{T3}$ e.g. such that a reception period will end by the time any microwave radiation from a previous transmission period reflected from a distance corresponding to the outer radius $R_0$ of the predetermined detection volume 4 can be received at the transmitter and receiver unit 2, any microwave radiation reflected from a distance outside the outer radius $R_0$ may be excluded from reception.

Consequently, when the receiver 15 is brought to detect reflected microwave radiation—which occurs during the third pulse—microwave radiation is received by the receiver 15. The receiver 15 is connected to a detection circuit (not shown) which is arranged for determining whether presence is detected. As mentioned above, such detection is previously known as such, and could be based on detection of the Doppler effect produced by a moving object for deciding whether there is any presence in the detection volume 4 based on the properties of the received microwave radiation. Relying on Doppler effect detection, any echoes originating from stationary objects may be filtered out.

The three different target pulse lengths $L_{T1}$, $L_{T2}$, $L_{T3}$ may thus be chosen according to requirements relating to the size of the detection volume 4 and the desired accuracy during presence detection. This means that these target values may be configurable depending on which vehicle type the system is fitted to. This allows for a generic configurable intrusion detector which can easily be adapted to different types of vehicles.

Figure 3:
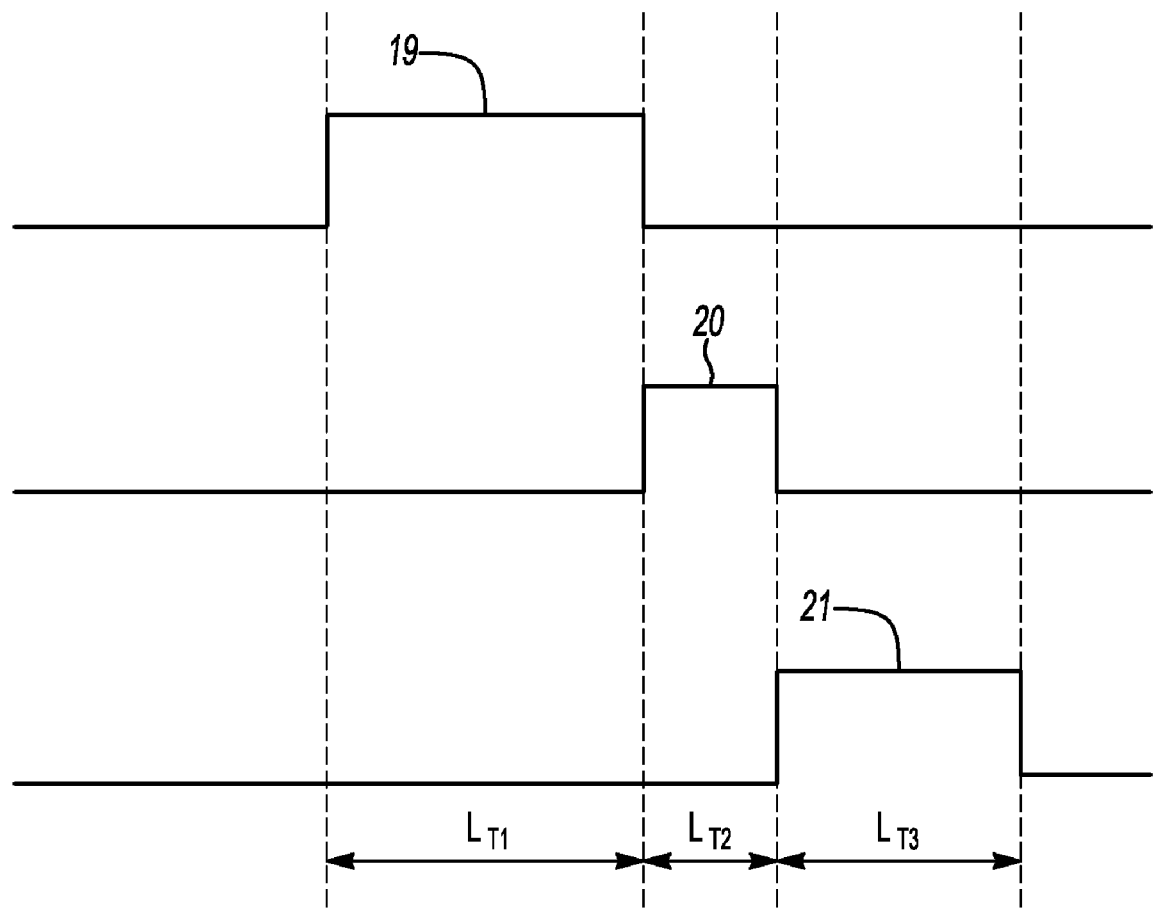
FIG. 3 is a diagram showing a sequence involving a number of timing pulses, the sequence illustrating the principles of the invention.

FIG. 3 shows a timing sequence involving a first pulse 19, a second pulse 20 and a third pulse 21, as explained above. As mentioned above, the first pulse 19 has a predefined first target length $L_{T1}$ which corresponds to a time during which microwave radiation is emitted into the detection volume 4, i.e. such that the transmitted microwaves have travelled a distance corresponding to the outer radius $R_0$ of the predetermined detection volume 4

When the first pulse 19 terminates, a second pulse 20 will be activated by means of the second pulse generator 11 as described above. This second pulse 20 constitutes a "pause" which corresponds to a certain time span from the termination of the first pulse 19 and until any microwave radiation which is reflected, e.g. by a person 5, inside a detection span between the inner radius $R_I$ and outer radius $R_O$ of the detection volume 4, can be expected to be reflected and to reach the receiver antenna 15. At the termination of the second pulse 20, the third pulse 21 is activated, which corresponds to actuation of the microwave receiver 15. At this stage, it will be possible to detect any occurring presence inside the detection span between the inner radius $R_I$ and outer radius $R_O$ of the detection volume 4.

As described above, the three pulses 19, 20, 21 are controlled by means of the pulse length detectors 9, 12, 17 and the comparators 10, 13, 18. These control circuits assure that the target pulse lengths $L_{T1}$, $L_{T2}$, $L_{T3}$ are maintained at their desired values with a high degree of accuracy.

The duration of the transmission interval, i.e. duration of the first pulse 19, and termination of the reception interval, i.e. termination of the third pulse 21, determines how far from the detector $R_O$ that detection is possible. The duration of the transmission/reception pause, i.e. duration of the second pulse 20, and thus the position of the reception interval, third pulse 21, in relation to the transmission interval, first pulse 19, determine the near detection interval $R_I$.

Having the possibility of precisely setting the transmission and reception intervals enables a very precise control of the outer $R_O$ and near $R_I$ detection boundaries, i.e. the inner radius $R_I$ and outer radius $R_O$ of the detection volume 4.

The disclosed apparatus and method, through the use of the comparator based regulation loops, enables the use of components in the respective pulse generators having wider tolerances, being less influenced by temperature, ageing and other variables, which means less costly components. This can be achieved while still achieving good precision during presence detection according to the invention. Otherwise, achieving equally good precision would require a costly selection of low tolerance components or supplier calibration procedures, and component variation would have a considerable detrimental effect on such systems.

The invention is not limited to the embodiment described above, but may be modified without departing from the scope of the claims below. For example, the invention can be used in different types of vehicles, for example load-carrying trucks, buses, boats and other types of vehicles and vessels.

The disclosed method and apparatus can be used for intrusion detection for vehicles such as cars and trucks or generally any type of defined space or zone, i.e. a detection volume. Also, it can be used for indoor and outdoor alarms, industrial robot control, home automation control, detection for actuating light when someone enters a room, automatic door openers and other applications in which there is a need for reliable and cost-effective detection of the presence of a human or animal in a detection volume.

The scope of the present invention also includes a system for presence control within a detection volume 4, delimited by an inner radius $R_I$ and an outer radius $R_O$ from a center of the detection volume 4. The system comprises a microwave-based transmitting and receiving unit 2 for transmitting microwaves from the center of the detection volume 4 by means of a microwave transmitter 6 and detecting microwave radiation reflected towards the center of the detection volume 4 by means of a microwave receiver 15. The system further comprises means for determining the presence of a moving object within the detection volume 4 based on the properties of the microwave radiation being received by the microwave receiver 15. Further, means are provided for controlling the outer radius of the detection volume 4 through selecting the length of a first pulse 19 for controlling the microwave transmitter 6 to transmit the microwaves and through selecting the length of a further pulse 21 for controlling the microwave receiver 15 to detect the microwave radiation reflected towards the center of the detection volume 4. Means are also provided for controlling the inner radius of the detection volume 4 through selecting the length of a pulse 20 for defining a predetermined time period $L_{T2}$ pause between the first pulse 19 for controlling the microwave transmitter 6 to transmit the microwaves and the further pulse 21 for controlling the microwave receiver 15 to detect the microwave radiation reflected towards the center of the detection volume 4.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A system for presence control within a detection volume delimited by an inner radius and an outer radius from a center of said detection volume, said system comprising:
    a microwave transmitter for transmitting microwaves from said center of said detection volume;
    a microwave receiver for detecting microwave radiation reflected towards said center of said detection volume;
    a first pulse generator generating a sequence of first pulses triggering the microwave transmitter, each first pulse having a length establishing a transmit interval of said microwave transmitter;
    a second pulse generator receiving the sequence of first pulses and triggered by a trailing edge of each first pulse to generate a sequence of second pulses, each of the second pulses immediately following and non-concurrent with the respective preceding first pulse; and
    a third pulse generator receiving the sequence of second pulses and triggered by a trailing edge of each second pulse to generate a sequence of third pulses triggering the microwave receiver and having a length to establish a receive interval thereof, each third pulse immediately following and non-concurrent with the respective preceding second pulse, whereby each second pulse has a length defining a time period pause between each first pulse and each respective following third pulse, and wherein the second pulse length added to the third pulse length is equal to a transmitter off-time separating the first pulses.

2. A method for presence detection within a detection volume delimited by an inner radius and an outer radius from a center of the detection volume, the method comprising:
    providing a microwave transmitter for transmitting microwaves from the center of the detection volume;
    providing a microwave receiver for detecting microwave radiation reflected towards the center of the detection volume;
    operating a first pulse generator to generate a sequence of first pulses triggering the microwave transmitter to transmit, each first pulse having a length establishing a transmit interval of said microwave transmitter;
    operating a second pulse generator to receive the sequence of first pulses and generate a sequence of second pulses when triggered by a trailing edge of each first pulse, each of the second pulses immediately following and non-concurrent with the respective preceding first pulse;
    operating a third pulse generator to receive the sequence of second pulses and generate a sequence of third pulses when triggered by a trailing edge of each second pulse, each third pulse triggering the microwave receiver to receive and having a length to establish a receive interval thereof, each third pulse immediately following and non-concurrent with the respective preceding second pulse, whereby each second pulse has a length defining a time period pause between each first pulse and each respective following third pulse, and wherein the second pulse length added to the third pulse length is equal to a transmitter off-time separating the first pulses; and
    determining the presence of a moving object within the detection volume based on properties of the microwave radiation being received by the microwave receiver.

3. The method according to claim 2 wherein the step of determining the presence of a moving object within the detection volume comprises using a Doppler motion sensor process.

4. The method according to claim 3 wherein it comprises:
    controlling the length of said first pulses by means of a first pulse length detector; and
    controlling the length of said third pulses by means of a third pulse length detector.

5. The method according to claim 4 wherein it comprises:
    providing a measurement by said first pulse length detector which is fed to a first comparator which is controlled with a first target pulse length; and
    providing a measurement by said third pulse length detector which is fed to a third comparator which is controlled with a third target pulse length.

* * * * *